(12) United States Patent
Huber et al.

(10) Patent No.: US 8,940,211 B2
(45) Date of Patent: *Jan. 27, 2015

(54) PLASTIC OBJECT FOR USE IN PERSONAL HYGIENE

(75) Inventors: Beat Huber, Buron (CH); Peter Waldispuhl, Triengen (CH)

(73) Assignee: Trisa Holding AG, Triengen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,604

(22) Filed: Nov. 22, 2011

(65) Prior Publication Data

US 2012/0068375 A1 Mar. 22, 2012

Related U.S. Application Data

(60) Division of application No. 12/461,242, filed on Aug. 5, 2009, now Pat. No. 8,083,980, which is a continuation of application No. 11/241,957, filed on Oct. 4, 2005, now Pat. No. 7,937,794, which is a division of application No. 10/765,972, filed on Jan. 29, 2004, now Pat. No. 6,972,106, which is a continuation of application No. 09/601,313, filed as application No. PCT/CH99/00586 on Dec. 7, 1999, now abandoned.

(30) Foreign Application Priority Data

Dec. 10, 1998 (CH) ........................ 2448/98

(51) Int. Cl.
*B29C 45/16* (2006.01)
*A46B 5/02* (2006.01)
*A46D 1/00* (2006.01)
*B29C 65/66* (2006.01)
*B29L 31/42* (2006.01)

(52) U.S. Cl.
CPC ... *A46B 5/02* (2013.01); *A46D 1/00* (2013.01); *B29C 45/16* (2013.01); *B29C 65/665* (2013.01); *A46B 2200/1066* (2013.01); *B29C 2045/1665* (2013.01); *B29C 2045/1681* (2013.01); *B29L 2031/425* (2013.01)
USPC .................. 264/255; 264/279; 264/328.1

(58) Field of Classification Search
USPC ........................ 264/255, 279, 328.1
See application file for complete search history.

(56) References Cited

U.S. PATENT DOCUMENTS 4,221,492 A    9/1980   Boscardin et al.
5,052,071 A   10/1991   Halm
(Continued)

FOREIGN PATENT DOCUMENTS

DE    3820814 A    1/1989
DE    40 36 361 A  7/1991
(Continued)

OTHER PUBLICATIONS

Office Action issued in U.S. Appl. No. 11/241,957; mailed Mar. 24, 2010.
(Continued)

*Primary Examiner* — James Sanders
(74) *Attorney, Agent, or Firm* — Oliff PLC

(57) ABSTRACT

A unitary two component article for personal hygiene, such as a toothbrush, wherein the same is formed by injection molding of two differing plastic materials. The plastics do not adhesively or chemically bond to each other. The two differing plastic parts of the toothbrush are mechanically connected, such as by interfitting portions of the two plastic components or by shrinking one plastic component about the other.

13 Claims, 3 Drawing Sheets

(56) References Cited

U.S. PATENT DOCUMENTS

| | | |
|---|---|---|
| 5,131,778 A | 7/1992 | Asai et al. |
| 5,339,482 A | 8/1994 | Desimone et al. |
| 5,398,369 A | 3/1995 | Heinzelman et al. |
| 5,464,578 A | 11/1995 | Salter et al. |
| 5,735,012 A | 4/1998 | Heinzelman |
| 5,761,759 A | 6/1998 | Leversby et al. |
| 5,769,506 A | 6/1998 | Boucherie |
| 5,778,478 A | 7/1998 | Coleman |
| 6,076,223 A | 6/2000 | Dair et al. |
| 6,292,973 B1 | 9/2001 | Maskovich et al. |
| 6,353,958 B2 | 3/2002 | Weihrauch |

FOREIGN PATENT DOCUMENTS

| | | |
|---|---|---|
| DE | 195 35 134 A | 3/1997 |
| EP | 0 561 051 A | 9/1993 |
| EP | 0 742 090 A1 | 11/1996 |
| WO | WO 96/10934 | 4/1996 |
| WO | WO 97/02770 A | 1/1997 |
| WO | WO 97/10938 A | 3/1997 |
| WO | WO 98/35809 | 8/1998 |

OTHER PUBLICATIONS

Gupta et al., "A Step Towards Integral Product/Process Development of Molded Multi-Material Structures," Proceedings of the TMCE 2004 (Apr. 13-17, 2004).

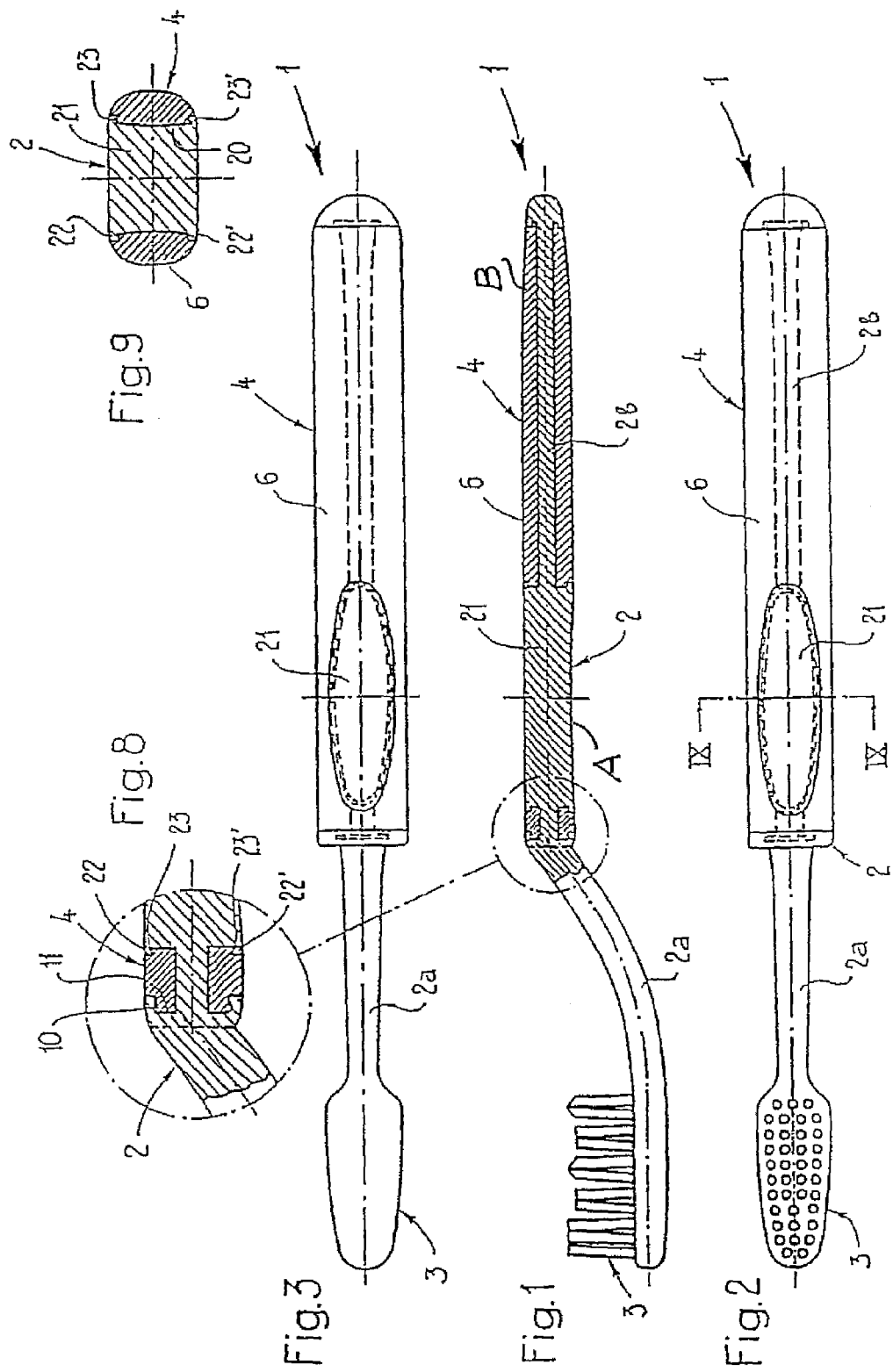

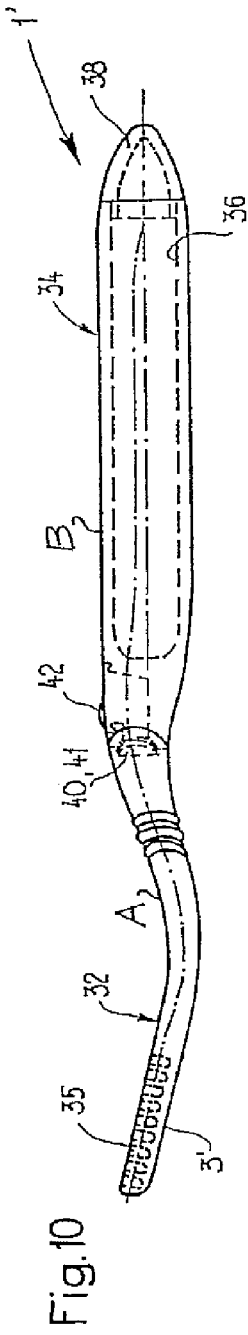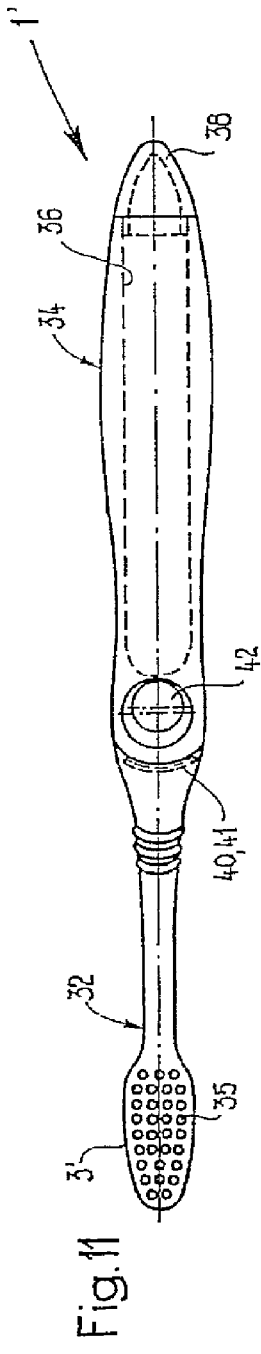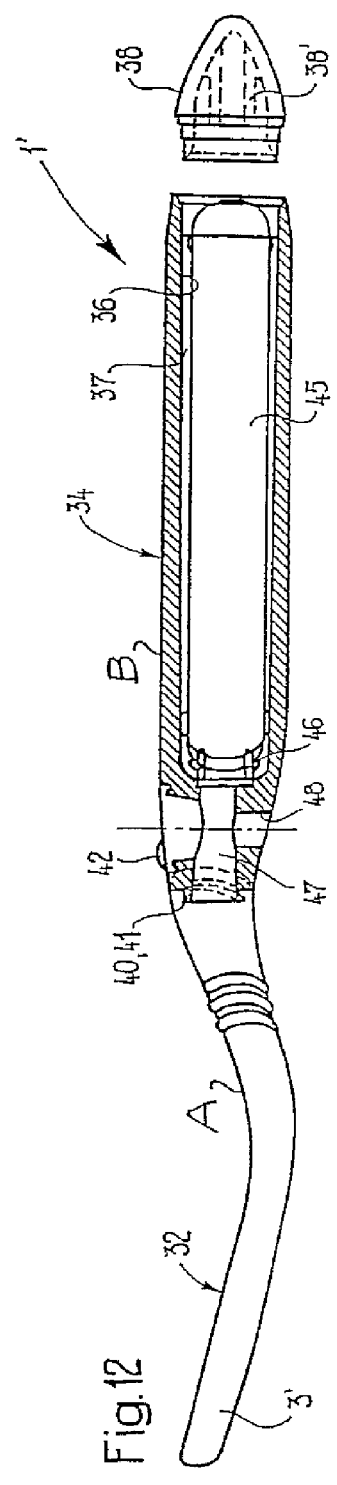

PLASTIC OBJECT FOR USE IN PERSONAL HYGIENE

CROSS-REFERENCE TO RELATED APPLICATIONS

This application is a Divisional of application Ser. No. 12/461,242 filed Aug. 5, 2009, which is a Continuation of application Ser. No. 11/241,957 filed Oct. 4, 2005, which is a Divisional of application Ser. No. 10/765,972 filed Jan. 29, 2004, which is a Continuation of application Ser. No. 09/601,313 filed Sep. 11, 2000, which is a U.S. National Stage application from PCT/CH99/00586 filed Dec. 7, 1999, which claims priority from Swiss Patent Application No. 2448/98 filed Dec. 10, 1998. The disclosures of the prior applications are hereby incorporated by reference herein in their entirety.

BACKGROUND OF THE INVENTION

1. Field of Invention

The invention relates to a plastic object for use in personal hygiene and to a method of producing the plastic object.

2. Description of Related Art

A plastic object of this type takes the form, for example, of a toothbrush. Toothbrushes are mass-produced articles and must therefore allow cost-effective production. Toothbrushes made of a single plastic material and toothbrushes made of two plastic components, which are produced for example by the two-component injection-molding process, are known. In the latter case, the toothbrush comprises two plastic parts: a first plastic part made of a first plastic material, for example polypropylene, extends from the handle of the toothbrush up to the brush head and has interconnected recesses. A second plastic part made of a second plastic material, for example thermoplastic elastomer, fills the recesses of the first plastic part. These two plastic materials bond with one another at the surface where the two plastic parts touch. In comparison with a toothbrush made of only one plastic material, this provides greater scope for design. Since, however, the two plastic materials have to bond with one another during the injection-molding operation, there are restrictions in the selection of the plastic materials and consequently in the design of the toothbrush.

This problem also affects other plastic objects for use in personal hygiene comprising at least two parts made of different plastic materials, such as for example containers or closure caps for containers intended for personal-hygiene preparations and substances, or for medical and dental preparations. There are restrictions in the selection of materials for the two parts in the case of such plastic objects as well.

SUMMARY OF THE INVENTION

The present invention is based on the object of providing a plastic object of the type mentioned at the beginning with which varied design is possible along with cost-effective production.

This object is achieved according to aspects of the invention. The method of producing such a plastic object is distinguished according to aspects of the invention. Preferred developments of the plastic object according to the invention and of the method according to the invention form additional aspects of the invention.

The fact that the two parts of the plastic object are formed by at least two molded parts consisting of different plastic materials which do not bond with one another during the injection-molding operation and are joined to one another in particular by a non-positive and/or positive fit means that there are many possibilities for an expedient design of the plastic object. Plastic materials of different chemical character can be used. They may differ to a greater or lesser extent in their structural formula and their chemical components. At the surfaces where they touch, there do not have to be any chemical or physical bonds, for example in the form of bridge formations or van der Waals forces, between the plastic materials. The frictional forces alone between the molded parts in the joint, preferably constructed in the manner of a shrink fit, are adequate to join the two molded parts firmly to one another. The positive fit realized by means of parts engaging in one another at the surfaces where the two molded parts touch prevents gaps into which water and contaminants can penetrate, or which can even lead to rupture, from forming between the two molded parts during the shrinking operation.

Therefore, in the case of a toothbrush for example, plastic materials with advantageous properties can be used at the right place. The one molded part may consist, for example, of polypropylene (polypropylene is available inexpensively, is flexible, chemically resistant but not completely transparent), while styrene acrylonitrile (SAN) (likewise inexpensive, transparent, esthetic) may be chosen for example for the other molded part. The molded part bearing the brush head is advantageously produced from polypropylene, since polypropylene is resistant to the often aggressive substances of the tooth-cleaning agents.

The two plastic materials advantageously have a different shrinkage behavior, since a firm shrink fit can be achieved more easily in this way. In this case, that molded part which is produced from plastic material with the lower degree of shrinkage is advantageously produced in a first step. The second molded part is produced from plastic material with the greater degree of shrinkage in a second step, thereby achieving a natural pressure of the second plastic material pressing against the first plastic material.

BRIEF DESCRIPTION OF THE DRAWINGS

The invention is explained in more detail below with reference to the drawing, in which:

FIG. 1 shows a first exemplary embodiment of a toothbrush comprising two molded parts in side view and partially in longitudinal section;

FIG. 2 shows the toothbrush according to FIG. 1 in plan view;

FIG. 3 shows the toothbrush according to FIG. 1 in a view from below;

FIG. 8 shows a joint of the two molded parts according to FIG. 1 on an enlarged scale;

FIG. 9 shows a section along line IX-IX in FIG. 2 on an enlarged scale;

FIG. 10 shows a second exemplary embodiment of a toothbrush comprising two molded parts in side view;

FIG. 11 shows the toothbrush according to FIG. 10 in plan view; and

FIG. 12 shows the toothbrush according to FIG. 10 on an enlarged scale, in side view and partially in section, a closure part for closing a handle cavity from the remaining part of the toothbrush being represented separately.

DETAILED DESCRIPTION OF PREFERRED EMBODIMENTS

Figure 4:
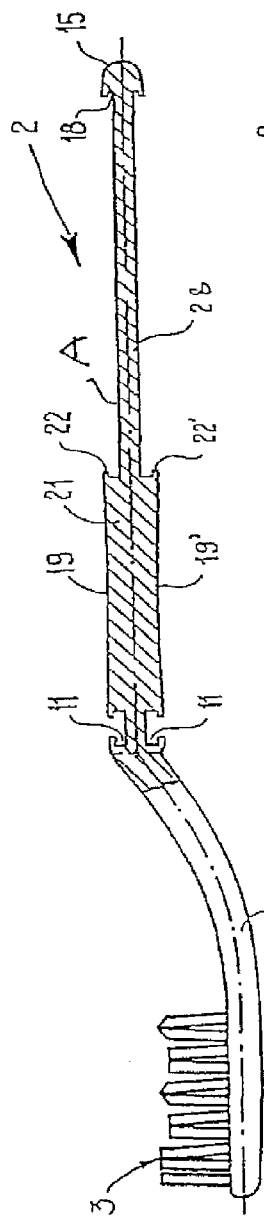
FIG. 4 shows a first molded part of the toothbrush according to FIG. 1 in elevation and partially in longitudinal section.

According to FIGS. 1 to 3, a toothbrush 1 has a first molded part 2, which bears a brush head 3 in its front region 2a. The first molded part 2, consisting of a plastic material A, is enclosed over a portion of its length, to be specific its rear handle region 2b, by a second molded part 4, consisting of a plastic material B, and is non-positively joined to the latter in the manner of a shrink fit. The plastic materials A and B are plastic materials of a kind which do not bond with one another during the injection-molding operation at the surfaces where they touch.

For better illustration, the two molded parts 2, 4 are represented separately from one another in FIGS. 4 to 7. The two molded parts 2, 4 have—as described further below—in the region where they touch diametrically opposite projections and recesses engaging in one another, by means of which a positive fit of the two molded parts 2, 4 is realized in addition to the non-positive fit of the same. It goes without saying that this joint is only produced during the injection-molding operation, in which one of the molded parts is injection-molded in a first step and then the other molded part is injection-molded around or into the first part in a second step. With the different degree of shrinkage of the two molded parts 2, 4, that molded part which is to be produced from plastic material with a lower degree of shrinkage is advantageously injection-molded first. In the second step, injection-molding of the other molded part takes place from plastic material with a greater degree of shrinkage, whereby a natural pressure of the second plastic material pressing against the first plastic material is produced.

Figure 5:
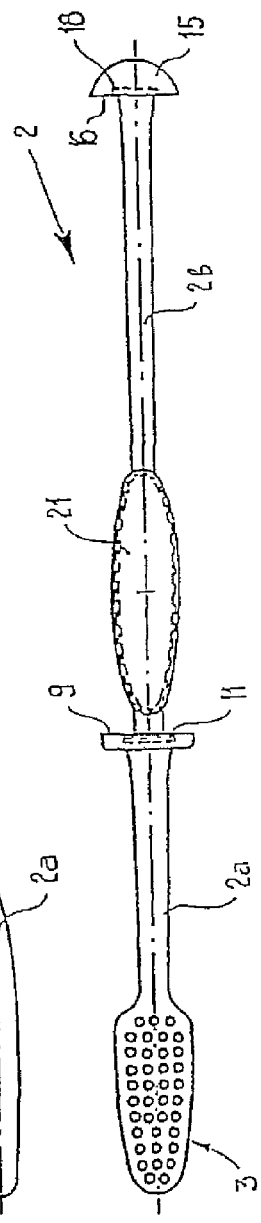
FIG. 5 shows the molded part according to FIG. 4 in plan view.
Figure 6:
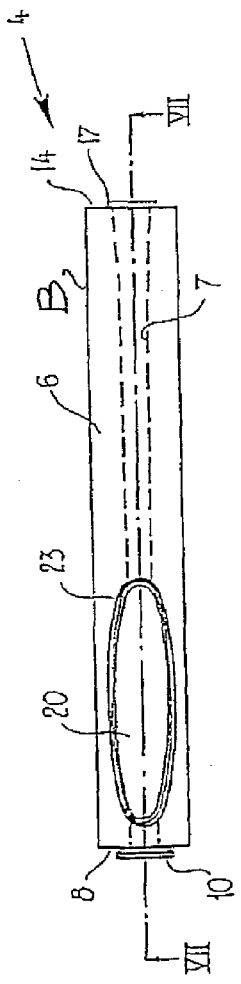
FIG. 6 shows a second molded part of the toothbrush according to FIG. 1 in plan view.
Figure 7:
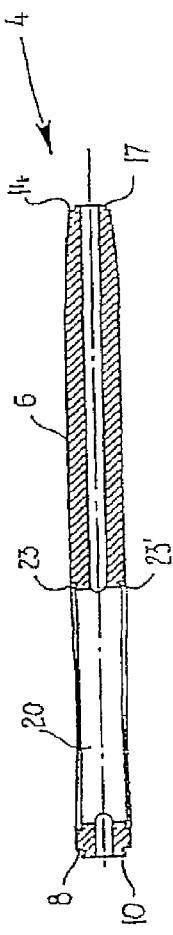
FIG. 7 shows a section along line VII-VII in FIG. 6.

The second molded part 4, represented individually in FIGS. 6 and 7 and essentially forming the toothbrush handle, is designed in the form of a sleeve, i.e. is provided with an internal longitudinal bore 7, which corresponds in its shape and diameter to the rear handle region 2b of the first molded part 2, represented individually in FIGS. 4 and 5. The sleeve-shaped molded part 4 has an outer surface 6.

A front end face 8 of the sleeve-shaped second molded part 4 is assigned to an offset surface 9 of the first molded part 2 (FIG. 4), seen in the longitudinal direction of the toothbrush. In this case, an annular, front projection 10 of the second molded part 4 protrudes into a diametrically opposite recess 11 of the first molded part 2, which can be seen particularly well from FIG. 8. A rear end face 14 of the sleeve-shaped second molded part 4 is assigned to an offset surface 16 of an end piece 15 of the first molded part 2. Here, too, an annular, rear projection 17 of the second molded part 4 protrudes into a diametrically opposite recess 18 of the end piece 15.

The second molded part 4 is provided with a cross-sectionally oval, elongate cross-bore 20, which is arranged transversely to the longitudinal bore 7 and is intended for a diametrically opposite part 21 of the first molded part 2, penetrating through the cross-bore 20. The oval part 21 has an upper edge surface 22 and a lower edge surface 22'. The second molded part 4 is provided with offset surfaces 23, 23', which run around the cross-bore 20 and are diametrically opposite the edge surfaces 22, 22'. The edge surfaces 22, 22' and the offset surfaces 23, 23' in turn form a type of projection/recess positive-fitting joint between the two molded parts 2, 4.

Together with outer surfaces 19, 19' (FIG. 4) of the oval part 21, the outer surface 6 of the sleeve-shaped molded part 4 forms a handle surface.

As far as the material for the two molded parts 2, 4 is concerned, polypropylene (PP) may be advantageously chosen, for example, as the plastic material A for the first molded part 2, while the second molded part 4 may consist, for example, of the following plastic materials B:

styrene acrylonitrile (SAN) and subgroups,
acrylonitrile-butadiene styrene (ABS) and subgroups,
polyamide (PA) and subgroups,
polycarbonate (PC) and subgroups,
polyester (PBT) and subgroups, or other transparent plastic materials not bonding with polypropylene (PP).

The respective subgroups comprise the plastic materials belonging to the corresponding family.

This combination of materials provides a special advantage. Since modern tooth-cleaning agents often contain aggressive substances, such as peppermint-oil for example, cheap plastics, such as SAN for example, are often attacked. If the first molded part 2, bearing the brush head 3, is made of PP, which is resistant to the aggressive substances but not completely transparent, and the second molded part 4, comprising the handle, is made of transparent, but less resistant SAN, this special embodiment of the invention constitutes a toothbrush which can be produced cost-effectively, is resistant to the aggressive substances of the tooth-cleaning agents and is also able to be esthetically pleasing. Of course, any other resistant plastic material may be used instead of PP and one of the cheaper, and therefore generally less resistant, plastic materials mentioned above may be used, for example, instead of SAN.

With these combinations of materials, preferably the second, sleeve-shaped molded part 4 is produced first, by means of injection molding, in a first step. Subsequently, the first molded part 2 is injection-molded in a second step, the positive fit already described being produced in the region where the two molded parts 2, 4 touch. The greater degree of shrinkage of the last-molded material A (PP) of the first part 2 has the effect of producing a natural pressure, pressing against the second part 4 consisting of material B (for example SAN), and a non-positive and positive fit of the two molded parts 2, 4 is brought about by the projections 10, 17, 22, 22' engaging in recesses 11, 18, 23, 23', without gaps into which water and contaminants can penetrate, or which can even lead to a rupture, forming between the plastic materials A, B, which actually do not bond with one another.

As an example, a toothbrush 1 comprising two molded parts 2, 4 has been presented and described. A different configuration of the two molded parts would be quite possible. The sleeve-shaped configuration of one of the molded parts is not absolutely necessary.

It goes without saying that a toothbrush could also have a plurality of molded parts made of plastic materials not bonding with one another during the injection-molding operation, which are joined to one another by a non-positive and/or positive fit.

Instead of the shrink fit and positive fit described, the individual molded parts, which do not enter into an adhesive or cohesive bond during the injection-molding operation, could be non-positively and/or positively joined to one another in any other way.

However, molded parts comprising two or more plastic components of which, for example, one (or more) component(s) of the one molded part cannot be bonded with one (or more) component(s) of the other molded part, could also be non-positively and/or positively joined to one another.

Represented in FIGS. 10 and 11 is a second exemplary embodiment of a toothbrush 1', which likewise has two molded parts 32, 34 consisting of different plastic materials A and B which do not bond with one another during the injection-molding operation. Here, too, the first molded part 32 forms a toothbrush part bearing the brush head 3' (the bristles of the brush head 3' are not represented in FIGS. 10 and 11; only the depressions 35 intended for anchoring tufts of bristles can be seen). The second molded part 34 forms a toothbrush handle. This is provided over part of its length with a cylindrical hollow 36, by which a cavity 37 which is open toward the rear and can be closed by means of a closure part 38 is formed in the toothbrush handle. The second molded part 34 preferably consists of an at least partially transparent or translucent material component, for example SAN, so that various esthetically acting means (loose objects, liquid, powder, printed rollers etc.) can be visibly accommodated in the cavity 37. The closure part 38 may be joined undetachably or detachably to the second molded part 34. In the latter case, useful objects, such as toothpicks or ampoules with mouth wash or toothpaste, may also be accommodated, for example, in the cavity 37.

In the case of this embodiment of a toothbrush as well, the surfaces where the two molded parts 32, 34 touch are provided with parts 40, 41 engaging in one another, so that the two plastic parts are brought into a non-positive and positive fit during injection molding. The parts 40, 41 engaging in one another are formed, for example, by a projection 40 on the end face of the molded part 34 forming the handle and a diametrically opposite recess 41 on the end face of the other molded part 32.

If the handle is produced from the transparent SAN, it is also the case with this embodiment that this handle-forming molded part 34 is preferably produced first in the injection-molding process and the molded part 32, bearing the brush head, is subsequently injection-molded, for example from more resistant polypropylene.

Both the bristle-bearing part of the toothbrush and the handle may have parts consisting of further material components. For example, a depression for a thumb rest 42, of a further material component, for example a thermoplastic elastomer (TPE), may be provided, for example, in the molded part 34.

The toothbrush shown in FIG. 12 corresponds to the toothbrush 1' according to FIGS. 10 and 11, but is represented on an enlarged scale in comparison with FIG. 10 and partially in section (the same parts are denoted by the same reference numerals). This toothbrush 1' is intended for the insertion of variously filled ampoules 45, for which a holder 46 of an elastically compliant plastic is present in the front region of the hollow 36. The closure part 38 is provided on the inside with an elastically compliant counterholder 38'. The ampoule 45 is held both radially and axially in its position by the two holders 46, 38'. The holder 46 may, for example, be injection-molded from the same plastic (preferably from PP) and in the same step with the molded part 32 bearing the brush head 3' (the joining channel present for this is denoted by 47 in FIG. 12). From the same plastic material and in the same step, a cross-bore 48 may also be filled in the molded part 34 injection-molded first (for example from SAN), whereby the thumb rest 42 is formed on the outer side of the handle.

The ampoules 45 may contain various esthetically acting objects (loose or suspended in a liquid), liquid, powder etc.

As already mentioned, other plastic objects similar to toothbrushes for use in personal hygiene could be formed from at least two molded parts which consist of different plastic materials which do not bond with one another during the injection-molding operation, and which are joined to one another by a non-positive and/or positive fit. For example, in the case of containers or closure caps for containers which are intended for personal-hygiene preparations and substances, or for medical and dental preparations, plastics with advantageous properties could likewise be used at the right place in cost-effective production.

What is claimed is:

1. A method for producing an article used in personal hygiene having a treatment head at a distal end, a handle at a proximal end, and a neck part connecting the treatment head and the handle, the proximal end being opposite to the distal end, and the article including at least two molded parts, the method comprising:

forming a first molded part from a uniform hard plastic material by injection molding, the first molded part defining a majority of an exterior of the handle such that the first molded part is biased toward the proximal end of the article;

subsequently forming a second molded part from a uniform hard plastic material by injection molding a plastic material into or around the first molded part, the second molded part defining the neck part, the treatment head, and a portion of the handle, the second molded part having a cross-section throughout that is non-hollow, a contact surface between the first molded part and the second molded part is not interrupted by any other molded plastic material component; and providing at least one further part formed of a thermoplastic elastomer on at least one of the first or second molded parts.

2. The method as claimed in claim 1, wherein the first molded part is injection molded by a first plastic material and the second molded part is injection molded by a second plastic material.

3. The method as claimed in claim 1, wherein the second molded part defines an end part at the proximal end of the article.

4. The method as claimed in claim 2, wherein the second plastic material does not form a chemical bond with the first plastic material during the injection molding.

5. The method as claimed in claim 1, wherein the article used in personal hygiene is a toothbrush.

6. The method as claimed in claim 1, further including forming a depression in at least one of the first and second molded parts, and providing the thermoplastic elastomer into the depression to form a thumb rest.

7. The method as claimed in claim 2, wherein the first plastic material has a lower degree of shrinkage than the second plastic material.

8. The method as claimed in claim 2, wherein the first plastic material is less resistant to an agent containing peppermint oil than the second plastic material.

9. The method as claimed in claim 2, wherein the first plastic material is transparent.

10. The method as claimed in claim 2, further including using styrene acrylonitrile, acrylonitrile-butadiene styrene, polyamide, polycarbonate or polyester as the first plastic material.

11. The method as claimed in claim 2, further including using polypropylene as the second plastic material.

12. The method as claimed in claim 1, further including forming one of projections and recesses on the first molded part on at least part of a contact surface contacting the second molded part, and forming the other of recesses and projections on the second molded part so as to engage the one of projections and recesses on the first molded part.

13. A method for producing an article used in personal hygiene having a treatment head at a distal end, a handle at a proximal end, and a neck part connecting the treatment head and the handle, the proximal end being opposite to the distal end, and the article including at least two molded parts, the method comprising:

forming a first molded part from a uniform hard plastic material by injection molding, the first molded part defining a majority of an exterior of the handle such that the first molded part is biased toward the proximal end of the article;

subsequently forming a second molded part from a uniform hard plastic material by injection molding a plastic material into or around the first molded part, the second molded part defining the neck part and a portion of the handle, the second molded part having a cross-section throughout that is non-hollow, a contact surface between the first molded part and the second molded part is not interrupted by any other molded plastic material component; and providing at least one further part formed of a thermoplastic elastomer on at least one of the first or second molded parts.

* * * * *